United States Patent
Yamazaki (10) Patent No.: US 10,459,088 B2
(45) Date of Patent: Oct. 29, 2019

(54) POSITIONING METHOD AND TERMINAL (71) Applicant: PANASONIC INTELLECTUAL PROPERTY MANAGEMENT CO., LTD., Osaka (JP)

(72) Inventor: Yasuhisa Yamazaki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 74 days.

(21) Appl. No.: 15/524,850

(22) PCT Filed: May 10, 2016

(86) PCT No.: PCT/JP2016/002273
§ 371 (c)(1),
(2) Date: May 5, 2017

(87) PCT Pub. No.: WO2016/181645
PCT Pub. Date: Nov. 17, 2016

(65) Prior Publication Data
US 2018/0052238 A1 Feb. 22, 2018

(30) Foreign Application Priority Data
May 13, 2015 (JP) .................. 2015-097799

(51) Int. Cl.
*G01S 19/43* (2010.01)
*G01S 19/44* (2010.01)
*G01S 19/50* (2010.01)

(52) U.S. Cl.
CPC .............. *G01S 19/43* (2013.01); *G01S 19/44* (2013.01); *G01S 19/50* (2013.01)

(58) Field of Classification Search
CPC .......... G01S 19/50; G01S 19/43–19/44; G01S 19/55
See application file for complete search history.

(56) References Cited

U.S. PATENT DOCUMENTS

2009/0017840 A1* 1/2009 Camp, Jr. ............ G01C 21/367
455/456.3
2009/0181650 A1* 7/2009 Dicke .................. G01C 21/32
455/414.1

(Continued)

FOREIGN PATENT DOCUMENTS

| JP | 2006-224737 | 8/2006 |
| JP | 2007-071844 | 3/2007 |
| JP | 2013-205012 | 10/2013 |

OTHER PUBLICATIONS

P.J.G. Teunissen, A new method for fast carrier phase ambiguity estimation, Proceedings of 1994 IEEE Position, Location and Navigation Symposium—PLANS'94, p. 562-573 (Year: 1994).*

(Continued)

*Primary Examiner* — Bernarr E Gregory
*Assistant Examiner* — Fred H Mull
(74) *Attorney, Agent, or Firm* — Greenblum & Bernstein, P.L.C.

(57) ABSTRACT

In a positioning method and a terminal according to the present disclosure, a processor positions a location of the terminal through interferometric positioning using a plurality of positioning signals received from a plurality of satellites. The processor calculates an integer bias for the plurality of positioning signals, selects a group of location candidates based on a float solution acquired through the calculation of the integer bias, and notifies that the terminal is located at a predetermined point on a map under a condition in which the group of location candidates is included in a line-shaped area.

10 Claims, 4 Drawing Sheets

(56) References Cited

U.S. PATENT DOCUMENTS

2011/0140959 A1* 6/2011 Vollath .................... G01S 19/44
342/357.27
2011/0187590 A1* 8/2011 Leandro ................. G01S 19/40
342/357.27

OTHER PUBLICATIONS

Map. (2016). The American Heritage Dictionary of the English Language (6th ed.). Boston, MA: Houghton Mifflin. Retrieved from https://search.credoreference.com/content/entry/hmdictenglang/map/0 (Year: 2016).*
P. Joosten et al., Fixing the Ambiguities: Are You Sure They're Right?, GPS World, p. 46-51, May 2000 (Year: 2000).*
International Search Report, dated Aug. 9, 2016 by the Japan Patent Office (JPO), in the corresponding International Application No. PCT/JP2016/002273.

* cited by examiner

POSITIONING METHOD AND TERMINAL

TECHNICAL FIELD

The present disclosure relates to a positioning method and a terminal.

BACKGROUND ART

In PTL 1, a remote distance in an approximately orthogonal direction from a positioning point to a line center is calculated based on accurate positioning data of the positioning point using an RTK technique and route data from a route database. Thus, it is determined whether the positioning point is present in a location of an area other than a railway track area, in a location of an area within a track, or a caution area or a dangerous area within the location of the track, and accurate information on safety and locations are provided to individual workers present in the railway tracks.

CITATION LIST

Patent Literature

PTL 1: Japanese Patent Unexamined Publication No. 2006-224737

SUMMARY OF THE INVENTION

According to the present disclosure, it is possible to increase the positioning speed of the terminal while maintaining sufficient positioning precision for whether or not the terminal is present within the line.

In a positioning method and a terminal according to the present disclosure, a processor positions a location of a terminal through interferometric positioning using a plurality of positioning signals received from a plurality of satellites. The processor calculates an integer bias for the plurality of positioning signals, selects a location candidate group which is acquired through the calculation of the integer bias, based on a float solution, and notifies that the terminal is located at a predetermined point on a map under a condition in which the location candidate group is included in a line-shaped area.

A positioning method and a terminal according to the present disclosure are useful in increasing a positioning speed of the terminal while maintaining sufficient positioning precision for whether or not the terminal is present within a line.

DESCRIPTION OF EMBODIMENTS

Hereinafter, exemplary embodiments will be described in detail by appropriately referring to the drawings. Here, unnecessarily detailed description may be omitted. For example, detailed description of already well-known matters or redundant description of substantially same redundant configurations may be omitted. By doing this, it is easy for those skilled in the art to understand the present disclosure by preventing the following description from being unnecessarily redundant.

The accompanying drawings and the following description are provided in order for those skilled in the art to sufficiently understand the present disclosure, and are not intended to limit the subject matter described in claims.

Exemplary Embodiment 1

Hereinafter, Exemplary Embodiment 1 will be described with reference to FIGS. 1 to 4.

[1-1. Configuration]

Figure 1:
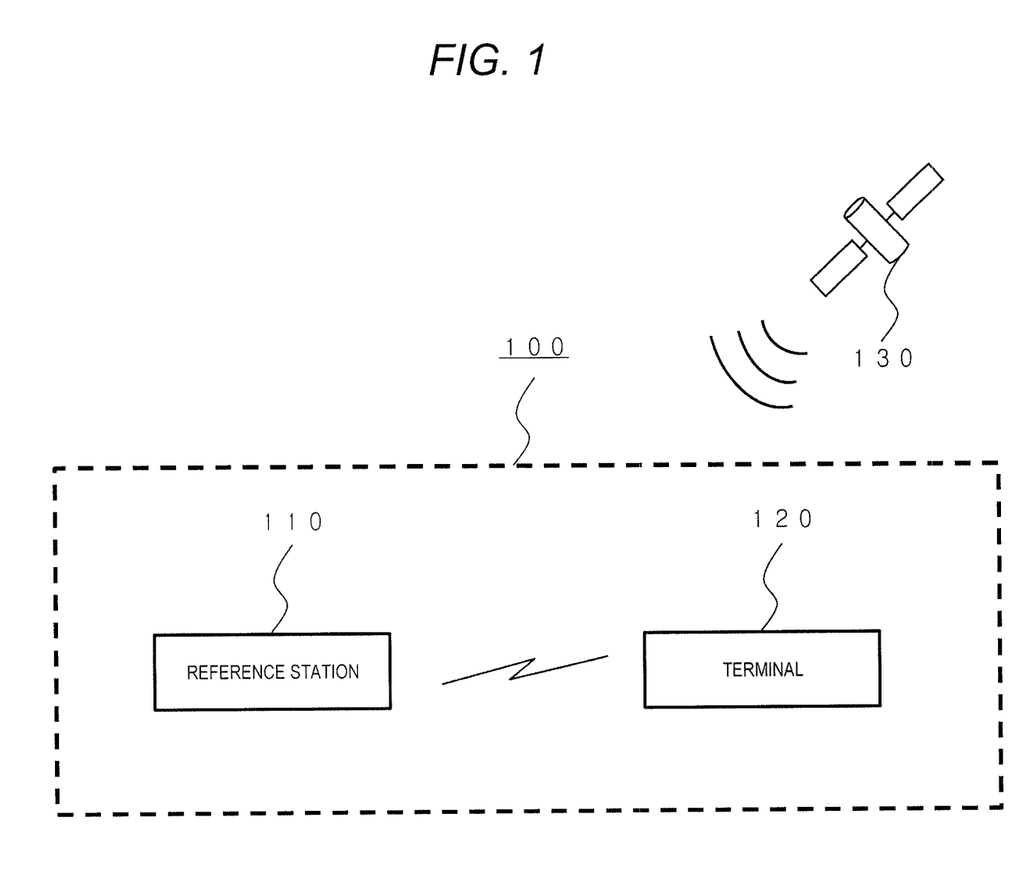
FIG. 1 is a diagram showing a positioning system according to Exemplary Embodiment 1.

FIG. 1 is a conceptual diagram of a positioning system according to Exemplary Embodiment 1.

Positioning system 100 includes reference station 110, and terminal 120.

Reference station 110 is a communication station of which a coordinate on Earth is known. Terminal 120 is an electronic device present in a place where the coordinate on Earth is desired to be calculated.

Terminal 120 according to the present exemplary embodiment performs positioning called interferometric positioning. The interferometric positioning is a technique of performing positioning using a wavelength of a positioning signal transmitted from satellite 130 as a reference.

Reference station 110 communicates with terminal 120. The content of communication of reference station 110 with terminal 120 includes transmission and reception of positioning data. The positioning data is one of information items required for positioning a location of terminal 120 through the interferometric positioning.

Positioning system 100 calculates a coordinate of terminal 120 on Earth by performing the positioning of terminal 120 by using correction information.

Figure 2:
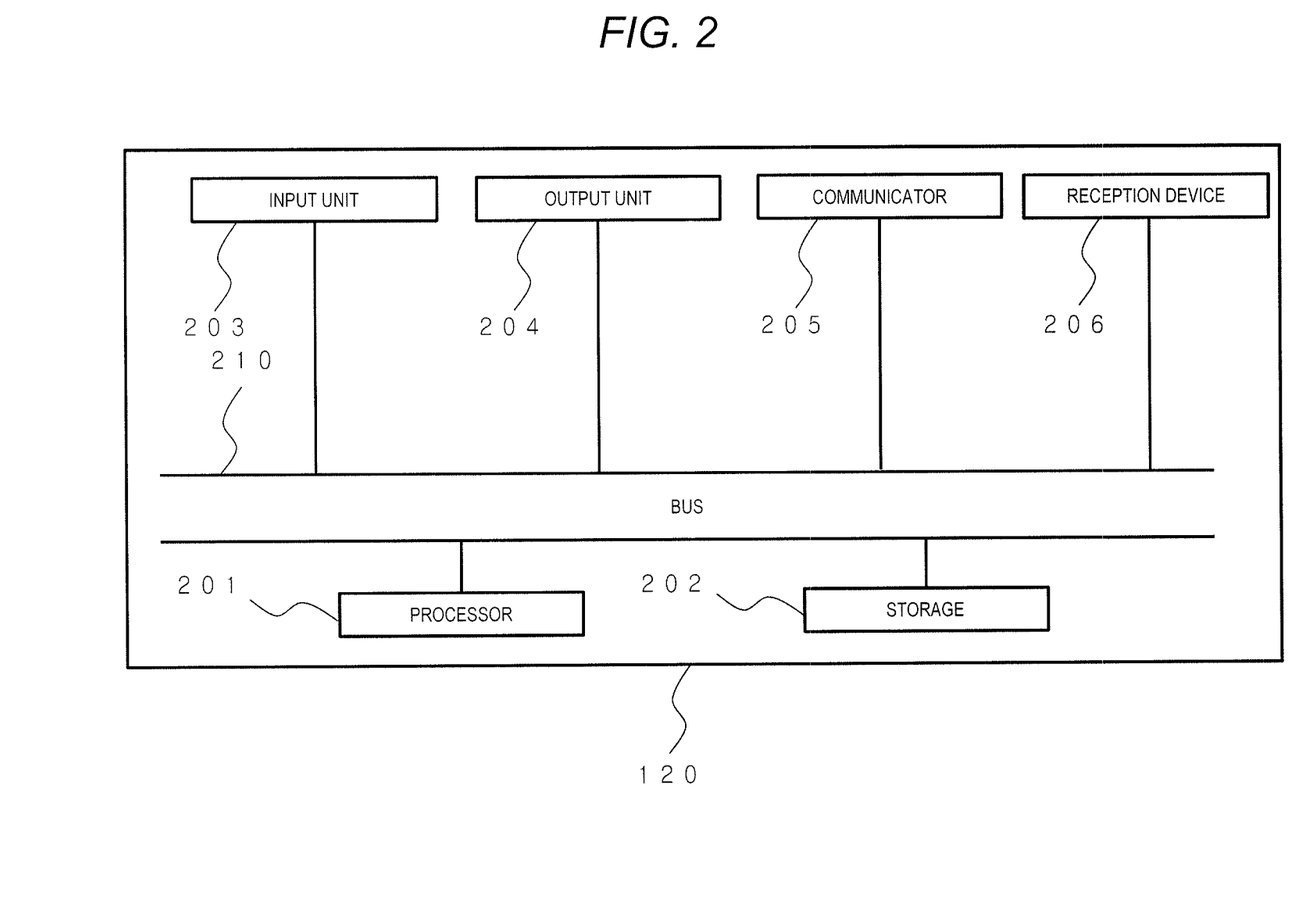
FIG. 2 is a block diagram of a terminal according to Exemplary Embodiment 1.

FIG. 2 is a block diagram of the terminal according to Exemplary Embodiment 1.

Reference station 110 includes processor 201, storage 202, input unit 203, output unit 204, communicator 205, reception device 206, and bus 210.

Processor 201 controls other elements of reference station 110 through bus 210. As one example, processor 201 may be constituted by a general-purpose central processing unit (CPU). Processor 201 may execute a specific program. Processor 201 executes the specific program, and thus, terminal 120 is operated.

Storage 202 acquires various information items from other elements, and retains these information items temporarily or permanently. Storage 202 may be a generic term of a so-called primary storage device and a so-called secondary storage device, and multiple storages 202 may be physically provided. For example, a dynamic random access memory (DRAM), a hard disk drive (HDD), or a solid state drive (SSD) is used in the configuration of storage 202.

Input unit 203 receives information from the outside. The information received by input unit 203 from the outside includes information regarding an input from an operator of reference station 110. As one example, input unit 203 may be constituted by an input interface such as a keyboard.

Output unit 204 presents information to the outside. The information presented by the output unit includes information regarding the positioning. As one example, output unit 204 may be constituted by an existing output interface such as a display.

Communicator 205 communicates with an external device through a communication path. The device with which communicator 205 communicates includes reference station 110. As one example, communicator 205 may be constituted by a communication interface capable of communicating with an existing communication network such as a 3G communication network, a wireless LAN communication network, or a wireless communication network using an ultra-short wave (30 MHz to 0.3 GHz).

Reception device 206 includes a receive antenna, and a demodulator. The reception device receives a positioning signal from a positioning satellite. In the present exemplary embodiment, a GPS satellite is used as one example of the positioning satellite. The GPS satellite transmits an L1 signal (1575.42 MHz) or an L2 signal (1227.60 MHz), as the positioning signal. A receiver demodulates the positioning signal received by the reception device.

The configuration of terminal 120 described above is an example. The terminal may be constituted by integrating some of the respective components of terminal 120. The terminal may be constituted by dividing some of the respective components of terminal 120 into a plurality of elements. Some of the respective components of terminal 120 may be omitted. The terminal may be constituted by adding other elements to terminal 120.

[1-2. Operation]

A positioning process performed by the terminal having the above-described configuration will be described.

Figure 3:
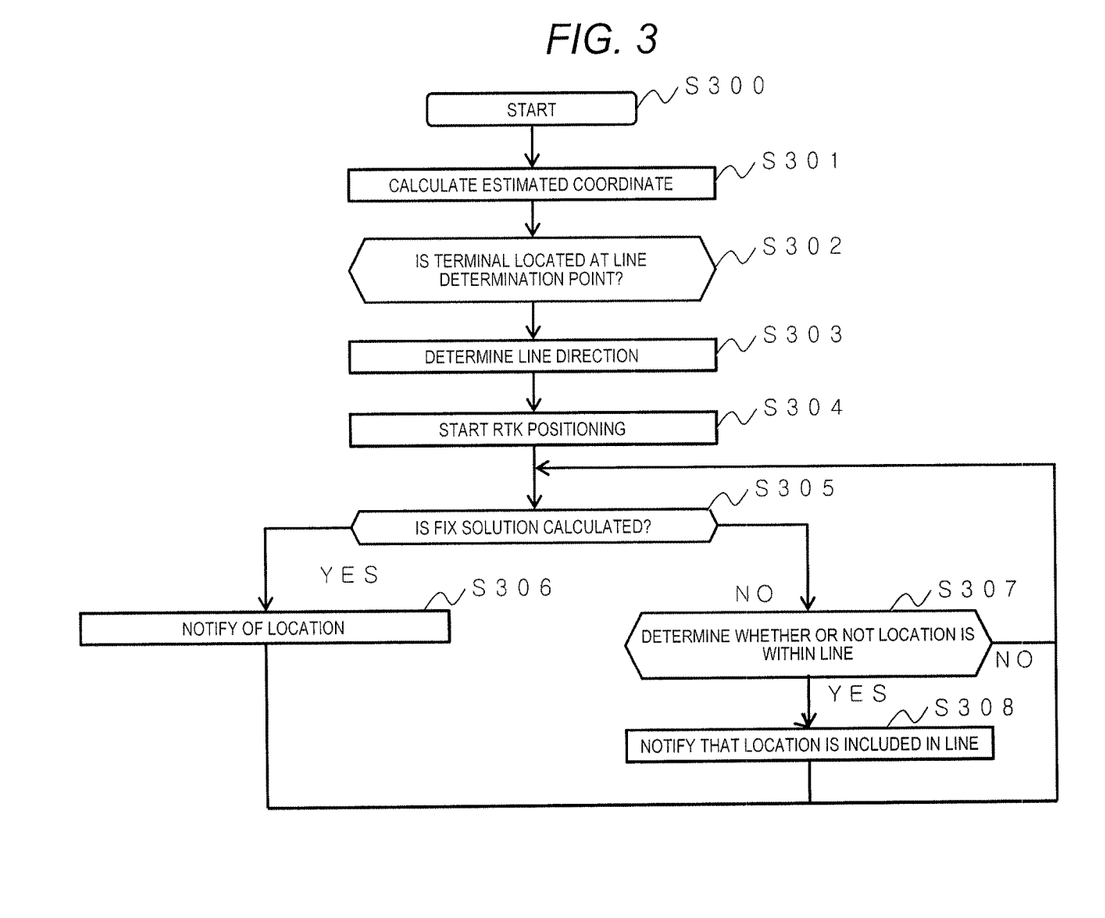
FIG. 3 is a flowchart showing a positioning process according to Exemplary Embodiment 1.

FIG. 3 is a flowchart showing the positioning process according to Exemplary Embodiment 1.

In step S300, processor 201 of terminal 120 starts the positioning process.

In step S301, processor 201 calculates an estimated coordinate of terminal 120. The estimated coordinate is calculated by processor 201 based on the positioning signal received by reception device 206. The process of calculating the estimated coordinate based on the positioning signal is generally known as code positioning. In the code positioning, processor 201 analyzes (1) a code (pattern of 0 and 1) indicating the positioning signal and (2) a time when the satellite transmits the code, and thus, the estimated coordinate is calculated. The estimated coordinate calculated through the code positioning includes an error due to influence of the ionosphere.

In step S302, processor 201 determines whether or not terminal 120 is present at a line determination point. In the present exemplary embodiment, it is assumed that a user of terminal 120 wants to know whether or not terminal 120 is present on a predetermined line-shaped area (for example, a track, an arterial road, or a pipe line). The line determination point is a point at which it is determined whether or not terminal 120 is present on the predetermined line-shaped area. There are various methods of adding a function of determining whether or not terminal 120 is present on the line-shaped area to processor 201. As one example, there is a method of allowing the user of terminal 120 to explicitly transmitting the notification that a point at which the terminal is currently present is the line determination point to processor 201 through input unit 203. As another example, there is a method of previously registering a geographic database in storage 202 and causing processor 201 to determine that the point at which the terminal is currently present is the line determination point based on matching of a coordinate of the code positioning acquired in step S301 with a predetermined area in the geographic database.

In step S303, processor 201 determines a line direction. The line direction refers to a long axis direction of the predetermined line-shaped area (for example, a track, an arterial road, or a pipe line). There are various methods of adding a function of determining the line direction to processor 201. As one example, it is necessary to attach a sensor such as a magnetic field sensor to terminal 120. A predetermined angle (perpendicular to a movement direction) with respect to the direction may be determined as the line direction by specifying a direction in which terminal 120 faces or a movement direction in which the terminal moves and transmitting the direction to processor 201 through input unit 203. As another example, a predetermined angle (perpendicular to the movement direction) with respect to the direction may be determined as the line direction by specifying the direction in which terminal 120 faces or the movement direction in which the terminal moves from a change of the estimated coordinate through the code positioning acquired in step S301.

Steps S302 and 303 described above is one method of causing processor 201 to determine the line-shaped area on a map. That is, if processor 201 can determine the line-shaped area on the map through another method, steps S302 and S303 may be replaced with this method. For example, processor 201 may determine the line-shaped area on the map by previously registering the geographic database in storage 202 and previously defining the line-shaped area within the geographic database.

In step S304, processor 201 starts a calculating process (RTK calculation process) of RTK positioning.

Here, the RTK calculation process will be described.

The RTK calculation process is a calculation process of performing an RTK technique which is one interferometric positioning.

In the RTK technique, the positioning of terminal 120 is performed by using a carrier phase integral value of the positioning signal transmitted from the positioning satellite. The carrier phase integral value is the sum of (1) the number of waves of the positioning signal and (2) a phase thereof from the satellite to a certain point. If the carrier phase integral value is calculated, since a frequency (and a wavelength) of the positioning signal are known, it is possible to calculate a distance from the satellite to a certain point. Since the number of waves of the positioning signal is an unknown value, the number of waves of the positioning signal is called an integer bias.

Removal of noise and estimation of the integer bias are important in performing the RTK technique.

In the RTK technique, the noise is removed by calculating a difference called a double difference. The double difference is a difference of values acquired by calculating a difference (single difference) of the carrier phase integral value of one receiver for two satellites between two receivers (reference station 110 and terminal 120 in the present exemplary embodiment). In the present exemplary embodiment, four satellites are used for performing the positioning using the RTK technique. Thus, the double difference is calculated for only a combination of four satellites. Processor 201 performs the calculation by using positioning data of reference station 110 and positioning data of terminal 120 which are previously acquired through communicator 205.

Here, the positioning data will be described. In the present exemplary embodiment, the positioning data includes pseudo distance information and carrier phase information.

The pseudo distance information is information regarding a pseudo distance between the satellite and reference station 110 or terminal 120. The processor (processor of reference station 110 or processor 201 of terminal 120) analyzes the positioning signal, and thus, the pseudo distance information may be generated. The processor may calculate an arrival time of the positioning signal based on two information items of (1) a difference between a pattern of a code conveyed by the positioning signal and a pattern of a code generated by the reference station or the terminal and (2) a signal generation time of the satellite included in a message (NAVDATA) included in the positioning signal and a signal reception time of the reference station or the terminal. The processor may calculate a distance from the satellite by multiplying the arrival time by a light velocity. This distance includes an error caused by the difference between a clock of the satellite and a clock of the reference station or the terminal. In general, the pseudo distance information is generated for four satellites in order to reduce this error.

The carrier phase information is a phase of the positioning signal received by the reference station or the terminal. The positioning signal (L1 signal or L2 signal) is a predetermined sine wave. The processor analyzes the positioning signal received by the reception device, and thus, the carrier phase information may be generated.

In the RTK technique, the integer bias may be estimated by various methods. As one example, in the present exemplary embodiment, the integer bias is estimated by performing a procedure of (1) the estimation of a float solution using the method of least squares and (2) verification of a fix solution based on the float solution.

The estimation of the float solution using the method of least squares is performed by setting up a simultaneous equation by using a combination of the double differences generated for every time unit and solving the set simultaneous equation by using the method of least squares. The simultaneous equation is set up for every time unit called an epoch. In this calculation, the positioning data of reference station 110, the positioning data of terminal 120, and the known coordinate of reference station 110 which are previously acquired in the above-described steps are used. A group of candidates of coordinates of the terminal acquired in this manner is called the float solution.

The integer bias estimated from each float solution calculated in this manner is a real number, whereas a true value of the integer bias is an integer. Thus, it is necessary to change the estimated integer bias to an integer value by rounding the estimated integer bias. However, a plurality of candidates is considered as a combination for rounding the estimated integer bias. Thus, it is necessary to verify whether or not these candidates are a correct integer value. A coordinate acquired based on a solution regarded as a reliable integer bias to a certain extent through the verification is called the fix solution. The positioning data of reference station 110 is also used for achieving narrowing efficiency of candidates of the integer value.

Processor 201 performs the calculation process described above as the RTK calculation process.

In step S305, processor 201 determines whether or not the fix solution is calculated in the RTK calculation process.

In a case where the fix solution is calculated (YES in step S305), the coordinate of terminal 120 acquired using the fix solution has precision on a per centimeter basis. Thus, in step S306, processor 201 outputs a location of terminal 120 through output unit 204. As means for outputting the location, various means may be applied. As one example, it is considered that the map is displayed on a display as output unit 204 and the coordinate of terminal 120 is displayed on the map.

The fix solution is rarely calculated for a short period of time in an actual RTK calculation process. However, the float solution as the candidate of the fix solution which is acquired during the calculation of the integer bias may be calculated for a period of time shorter than that in the calculation of the fix solution.

In the present exemplary embodiment, even in a case where the fix solution is not calculated (NO in step S305), the processor determines whether or not a location candidate group acquired based on the float solution is within a predetermined line-shaped range (step S307).

Step S307 will be described with reference to FIG. 4.

Figure 4:
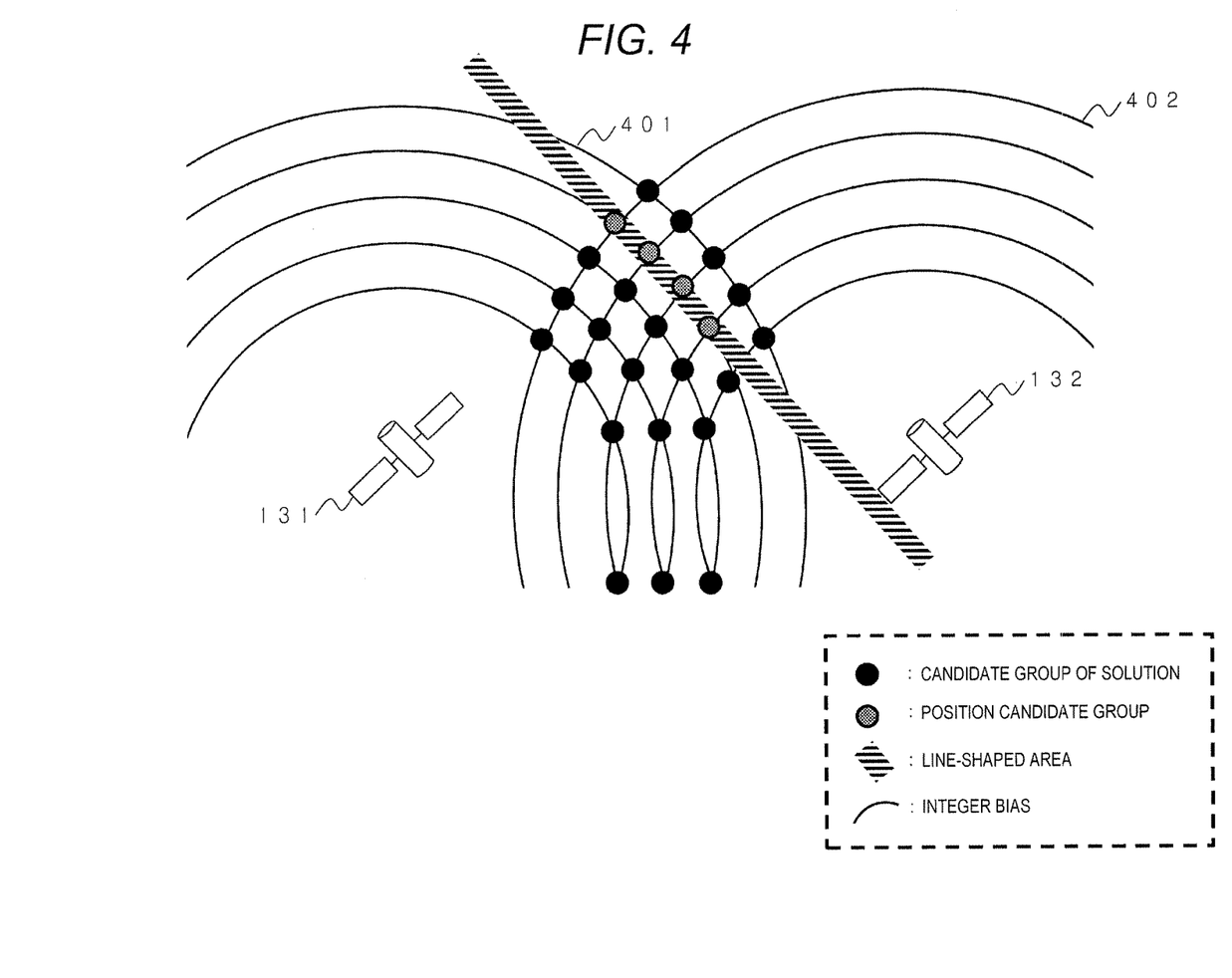
FIG. 4 is a diagram for describing the relationship between a position candidate group and a line-shaped area according to Exemplary Embodiment 1.

FIG. 4 is a diagram for describing the relationship between the location candidate group and the line-shaped area according to Exemplary Embodiment 1.

FIG. 4 is a diagram when satellite 131, satellite 132, and the Earth's surface is looked down from the sky.

Positioning signal 401 and positioning signal 402 are pseudo representations of the positioning signals transmitted from first satellite 131 and second satellite 132. The positioning signal has a predetermined frequency (wavelength). However, if a predetermined phase of the positioning signal is floated, the phase is looked as if the phase spreads in a ripple shape from the satellite. This ripple may be sound regarded as the integer bias in a case where a phase component in the RTK calculation is removed. In FIG. 4, positioning signals 401 and 402 are pseudo representations in a case where the integer bias is recognized as the ripple.

The candidate group of the solution is a place where positioning signal 401 and positioning signal 402 are superimposed. As stated above, the RTK calculation is calculation for simultaneously solving a place (+ phase) where the reference station or the terminal is present for the plurality of satellites. A state in which the fix solution is not acquired in the RTK calculation means that the number of ripples is instable. That is, the candidate of the solution in the RTK calculation appears in a lattice shape as in the candidate group of the solution shown in FIG. 4.

Processor 201 calculates the float solution even though the fix solution is not acquired as stated above.

The float solution is a combination of a specific coordinate and the likelihood that the coordinate will be a coordinate of the terminal of the coordinate is true. If there is a plurality of candidates of a specific coordinate and the integer bias is estimated based on a float solution having a high likelihood among these candidates, candidates of the plurality of integer biases are acquired.

The position candidate group shown in FIG. 4 is a location candidate acquired based on the float solution, and is specifically, a group of locations (location candidate group) located based on the group of integer biases estimated from the float solution.

In step S307, processor 201 determines whether or not location candidate group is included in the line-shaped area determined in step S303.

In a case where the location candidate group is included in the line-shaped area as shown in FIG. 4 (YES in S307), precision within the line in a short-axis direction is assumed as being sufficient, and processor 201 notifies the user that the location candidate group is included in at least the line-shaped area through output unit 204 (S308). As one example of the notification, there are "You are on an up lane of AA road", "You are on an up lane of BB road", or a notification indicating that any signal is simply turned on.

In a case where the location candidate group is not included in the line-shaped area (NO in S307), the process returns to step S305.

[1-3. Advantages]

As mentioned above, in the present exemplary embodiment, in the positioning method and the terminal according to the present disclosure, the processor performs the positioning of the location of the terminal through the interferometric positioning using the plurality of positioning signals received from the plurality of satellites. The processor calculates the integer bias for the plurality of positioning signals, selects a group of location candidates based on the float solution acquired through the calculation of the integer bias, and notifies that the terminal is located at a predetermined point on the map under a condition in which the group of location candidates is included in the line-shaped area.

Thus, it is possible to determine whether or not the group of location candidates is included in the line-shaped area with predetermined precision even in a state in which the solution of the interferometric positioning is not still acquired. Accordingly, it is possible to increase the positioning speed of the terminal while maintaining sufficient positioning precision for whether or not the terminal is present within the line.

The processor calculates the estimated coordinate of the location of the terminal, and defines the line-shaped area based on the calculated estimated coordinate.

Thus, the estimated coordinate is utilized in the definition of the line-shaped area. Accordingly, the user does not need to define the entire line-shaped area. Therefore, it is possible to position the terminal at a higher speed while maintaining sufficient positioning precision for whether or not the terminal is present within the line.

The processor calculates the movement direction of the terminal, and defines the line-shaped area based on the calculated movement direction.

Thus, the movement direction of the terminal is utilized in the definition of the direction of the line. Accordingly, the user does not need to define the entire line-shaped area. Therefore, it is possible to position the terminal at a higher speed while maintaining sufficient positioning precision for whether or not the terminal is present within the line.

The processor defines the line-shaped area by using information acquired from the geographic database.

Thus, in a case where the determination in a specific line shape on the geographic database is desired to be performed, it is possible to position the terminal at a higher speed while maintaining sufficient positioning precision for whether or not the terminal is present within the line.

Another Exemplary Embodiment

As stated above, Exemplary Embodiment 1 has been described as an example of the technology disclosed in the present application. However, the technology of the present disclosure is not limited thereto, and may be applied to exemplary embodiments acquired by appropriately performing modification, replacement, addition, and omission on the above-described exemplary embodiment. A new exemplary embodiment may be acquired by combining the respective components described in Exemplary Embodiment 1 described above.

The above-described exemplary embodiment is provided to illustrate the technology of the present disclosure, and may be variously modified, replaced, added, and omitted in claims or an equivalent scope.

INDUSTRIAL APPLICABILITY

The present disclosure is applicable to positioning performed when road construction or track construction is conducted.

REFERENCE MARKS IN THE DRAWINGS 100 positioning system
110 reference station
120 terminal
130 satellite
131 satellite
132 satellite
201 processor
202 storage
203 input unit
204 output unit
205 communicator
206 reception device
210 bus
401 positioning signal
402 positioning signal

The invention claimed is:

1. A notifying method, comprising:
causing a processor to calculate an integer bias for a plurality of positioning signals received from satellites;
causing the processor to select a location candidate group that is acquired through the calculation of the integer bias, based on a float solution, the location candidate group indicating candidates of a location of a terminal; and
causing the processor to notify that the terminal is located at a predetermined point on a map, under a condition in which the location candidate group is included in a line-shaped area and the solution indicating the location of the terminal has not been acquired based on the calculated integer bias.

2. The notifying method of claim 1, further comprising:
causing the processor to calculate an estimated coordinate of the location of the terminal; and
causing the processor to define the line-shaped area based on the calculated estimated coordinate.

3. The notifying method of claim 1, further comprising:
causing the processor to calculate a movement direction of the terminal; and
causing the processor to define the line-shaped area based on the calculated movement direction.

4. The notifying method of claim 1, further comprising:
causing the processor to define the line-shaped area by using information acquired from a geographic database.

5. The notifying method of claim 1,
wherein the processor selects the location candidate group, from among location candidates acquired through the calculation of the integer bias, based on a likelihood about whether a candidate of location indicated by the location candidate is a true location of the terminal.

6. A terminal, comprising:
a processor; and
a storage,
wherein the processor is configured to perform operations, including
calculating an integer bias for a plurality of positioning signals received from satellites,
selecting a location candidate group that is acquired through the calculation of the integer bias, based on a float solution, the location candidate group indicating candidates of a location of a terminal and
notifying that the terminal is located at a predetermined point on a map, under a condition in which the location candidate group is included in a line-shaped area and the solution indicating the location of the terminal has not been acquired based on the calculated integer bias.

7. The terminal of claim 6,
wherein the operations performed by the processor further include calculating an estimated coordinate of the location of the terminal, and
defining the line-shaped area based on the calculated estimated coordinate.

8. The terminal of claim 6,
wherein the operations performed by the processor further include calculating a movement direction of the terminal, and
defining the line-shaped area based on the calculated movement direction.

9. The terminal of claim 6,
wherein the operations performed by the processor further include defining the line-shaped area by using information acquired from a geographic database.

10. The terminal of claim 6,
wherein the operations performed by the processor further include selecting the location candidate group, from among location candidates acquired through the calculation of the integer bias, based on a likelihood about whether a candidate of location indicated by the location candidate is a true location of the terminal.

\* \* \* \* \*